(12) United States Patent
Osborne et al.

(10) Patent No.: US 8,403,026 B2
(45) Date of Patent: Mar. 26, 2013

(54) PRESSURE CASTING OF ELECTRIC ROTORS

(75) Inventors: Mark A. Osborne, Grand Blanc, MI (US); Barry L. Priem, Saginaw, MI (US); Dale A. Gerard, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 12/409,726

(22) Filed: Mar. 24, 2009

(65) Prior Publication Data

US 2010/0243197 A1    Sep. 30, 2010

(51) Int. Cl.
*B22D 19/00* (2006.01)
*B22D 19/16* (2006.01)
*B22D 27/04* (2006.01)

(52) U.S. Cl. ........ 164/103; 164/109; 164/493; 164/119; 164/138

(58) Field of Classification Search ............... 164/98, 164/103, 138, 119, 492, 493, 109
See application file for complete search history.

(56) References Cited

U.S. PATENT DOCUMENTS

| 3,570,117 A | * | 3/1971 | Kitamura et al. | 29/598 |
| 4,121,926 A | * | 10/1978 | Ogawa et al. | 420/548 |
| 4,760,300 A | * | 7/1988 | Yoshida et al. | 310/211 |
| 5,365,997 A | * | 11/1994 | Helgesen et al. | 164/103 |
| 2004/0244936 A1 | * | 12/2004 | Jahedi et al. | 164/72 |

FOREIGN PATENT DOCUMENTS

CN    1122065        5/1996
JP    2001-78409   * 3/2001

* cited by examiner

*Primary Examiner* — Kevin P Kerns
(74) *Attorney, Agent, or Firm* — Dinsmore & Shohl LLP (57) ABSTRACT

A rotor for an induction motor and a method of preparing same. The method includes making a squirrel-cage rotor made up of a cage and a laminate stack by forming a mold around the stack, heating the stack and introducing a molten metal into the mold such that the molten metal substantially fills a space defined in the stack that corresponds to the cage. In one form, the space includes slots or related channels formed in the stack that upon filling with the molten metal become longitudinal bars that form electric current loops with end rings of the cage. By heating the stack and maintaining it at a temperature high enough to keep the molten metal in a substantially molten state at least long enough for it to flow through the slots of the stack, premature freezing of the molten metal is avoided. In addition, by providing low pressure to the molten metal in conjunction with the elevated temperature in the stack, flow is promoted to ensure a substantially porosity-free, fully dense squirrel-cage for the rotor.

26 Claims, 6 Drawing Sheets

PRESSURE CASTING OF ELECTRIC ROTORS

BACKGROUND OF THE INVENTION

The present invention relates generally to electric motors and their manufacture, and more particularly, to methods for casting rotors for electric induction motors.

One form of electric induction motor involves a rotating armature (rotor) surrounded by a coil-wound stationary field (stator). When electric current is passed through the stator windings, a part of the stator known as the pole (which may be made up of a magnetically permeable material, such as iron) around which the windings are wrapped becomes magnetically energized, which in turn imparts an electromagnetic force to the rotor, causing it to rotate. In motive applications, a shaft attached to the rotor can be used to provide propulsive force to a vehicle through the turning of one or more linked wheels. Such a motor could be especially useful in vehicles that rely either entirely on electric power, or as part of a hybrid system, where the electric motor and an internal combustion engine (such as conventional gasoline or diesel engine) cooperate with one another to produce the motive force.

A "squirrel-cage" rotor is a common example of an electric induction motor, and derives its name from its cage-like cylindrical shape, where numerous metal rotor bars or rods extend longitudinally and are spaced around the cylindrical periphery of a central axis of rotation. The bars are held in a fixed relationship to one another by metal end rings so that adjacent bars and connected end rings form numerous coil-like electrically continuous loops. Due to the proximity of the rotor to the stator, changes in the magnetic field produced in the stator induce current in the highly conductive loops formed by the bars and end rings. This current turns the rotor into an electromagnet that can spin in an attempt to align itself with the magnetic field produced in the stator. To increase the magnetic intensity of the rotor, a series of laminated plates (typically made from a material that has a lower magnetic resistance (i.e., more magnetically permeable) than air, such as iron) are mounted to the shaft or related mandrel such that they occupy the substantial entirety of the space between the shaft and the cage formed by the bars and end rings. Typically, an interlocking stamping process or loose laminations could be used to secure each of the plates together. Moreover, a low electrical conductivity material (for example, a coating) could be used to minimize electrical contact between them. The cooperation of the laminated stack of plates with the current flowing through the loops of the cage help to strengthen the magnetic field generated by the loops of the rotor, and leads to higher levels of torque generated in the attached shaft. To keep the torque generated at a relatively constant level, the bars making up the cage may be skewed to define a slightly helical pattern rather than one that is strictly longitudinal. In one form, the bars and end plates are separately-formed structures that are joined together through well-known techniques. As with the connection between the plates of the laminate stack, a non-conducting adhesive may be used to secure the bars to the slots of the laminated plates.

In another common form, the longitudinal metal bars may be cast directly into the slots once the laminate plate structure has been assembled. Casting of a squirrel-cage rotor is advantageous relative to assembling it from separate parts, as it reduces the cost and manufacturing variances associated with assembled components. As with the formed bars discussed above, it is desirable to make the cast bars from a high electrical conductivity material, such as copper or aluminum. The manufacture of the rotor cage through casting has traditionally been done by high pressure die casting or squeeze casting. With die casting, molten metal is forced under high pressure into reusable die molds that are typically made from a tool-grade steel. This process is well-known, and is relatively inexpensive. With squeeze casting, the molten metal is injected at a lower, less turbulent velocity, with higher pressures, into a die, and is also typically made from a tool-grade steel.

Unfortunately, either of these forms of squirrel-cage rotor casting suffers from drawbacks. In particular, the cross-sectional dimensions of the passages formed in the laminate stack that define the slots for the longitudinal bars are typically very small (for example, on the order of 2 millimeters), thereby requiring rather large pressures (typically between 2000 and 5000 pounds per square inch gauge (PSIG)). Such pressures, while promoting fast (on the order of a tenth of a second) fill time, also result in high molten flow turbulence and related gas entrapment in the relatively long but narrow passages and in the end rings. Of particular concern is the increased porosity of the bars and end rings that make up the rotor's cage, especially at the remote end from the molten metal injection site. Because the performance of squirrel-cage rotors is closely related to the electrical continuity between the bars and the end rings, such porosity is undesirable. Equally problematic is the impact that porosity has on the mechanical properties of the cast rotor, again especially at the end remote from the mold gating and related fluid introduction. With a rotor diameter of up to approximately eight inches spinning at speeds of between 10,000 and 15,000 revolutions per minute (RPM), a porous end ring will be more likely to fail than a fully dense one.

As mentioned above, both die casting and squeeze casting involve the use of steel molds, while substantially pure aluminum, with its combination of high electrical conductivity and low cost relative to copper, is frequently used as the casting material for the squirrel-cage of the rotor. When such aluminum in molten form comes in contact with the tooling-grade steel of a die cast or squeeze tooling die set, it aggressively attacks the iron in the die. As such, the useful life of such die sets (which are expensive to replace) is rather limited.

A more recent alternative has been to use semi-solid metal (SSM) casting. Instead of using liquid metal, the SSM casting process uses metal that is partially solid and partially liquid, where the consistency of the metal allows it to be injected into dies at relatively low pressures. SSM, while reducing the likelihood of porosity in the finished part relative to the methods discussed above, involves complex mixing or shaking to take advantage of the material's thixotropic properties, and is therefore expensive. Furthermore, SSM may be very difficult to control with high purity aluminum, copper or alloys thereof, which often have very limited solidification ranges.

Another problem with conventional casting techniques is that the molten metal in any one of the passages has a tendency to solidify (i.e., freeze) prior to passing through the narrow passageways formed in the laminate stack and into the remote end ring. This tendency is exacerbated when the temperature of the laminate stack is relatively low, as such tends to act as a heat sink for the flowing molten metal.

Accordingly, it would be desirable to provide a casting method for forming squirrel-cage rotors for induction motors that reduces the occurrence of porosity and the related reduction in the mechanical and electrical properties of the rotor. It would also be desirable to keeping the cost of such casting low.

BRIEF SUMMARY OF THE INVENTION

These desires are met by the present invention, wherein a method and device that incorporates the features discussed below are disclosed. In accordance with a first aspect of the present invention, a method of casting a squirrel-cage rotor is disclosed. The method includes forming a mold around a laminate stack portion of the electric motor, heating the laminate stack, introducing a molten metal into the mold, cooling the molten metal and the laminate stack such that the squirrel-cage rotor solidifies, and removing the substantially solidified rotor from the mold. In the present context, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference while still preserving the basic function of the subject matter at issue. An important part of the process is its use of lower feed pressures (less than 30 PSIG versus conventional 2000 to 5000 PSIG) to avoid turbulence and related trapped gas and concomitant porosity, as well as heating the laminate stack gives it enough thermal mass to avoid premature aluminum freezing such that the molten metal substantially fills a space defined in the laminate stack that corresponds to the cage portion of the squirrel-cage rotor, the heated laminate stack possessing sufficient thermal mass to keep the molten metal in a substantially molten state until a substantial entirety of the cage is formed. A mold for forming the rotor includes a cavity defining a proximal end ring, a distal (or remote) end ring and numerous passages for forming rotor bars that establish fluid communication between the end ring cavities. The mold can be formed around a laminated stack of rotor plates.

Optionally, the molten metal is preferably a high purity aluminum, high purity copper or alloys thereof. In addition, the casting mold around the stack is made from a sand core assembly. The sand core binder may be made from an organic resin or an inorganic binder. In a more particular form, a sand-based mixture may include up to about 2 percent by weight of the binder material. The sand/binder material is introduced into a core box and then hardened by means of a catalyst or heat, depending on the binder. The hardened sand/binder mixture is then removed from the core box, resulting in a sand core. The core box cavity that the sand/binder mixture is introduced into creates the geometry required for the sand core. The sand cores with the correct geometry are then assembled to create the casting mold. The casting geometry is formed by the geometry of the sand cores that are used to comprise the casting mold. In another variation, the mold that is formed around the laminate stack is made from a coated steel tool, where the coating can protect the steel tool from direct contact with the poured molten metal. Such a version is considered to be a semi-permanent tool. As with the sand casting configuration, the interior sand core of the semi-permanent tool can be used to allow induction heating.

In additional options, the time between the heating of the laminate stack and the introducing of a molten metal into the mold is relatively short, and depending on the size of the rotor being formed, is preferably less than 2 minutes (slightly longer for larger rotors). Moreover, the heating system can be held active during the filling process. The heating forms an important step, in that in situations where the molten metal is substantially pure aluminum (or an aluminum with similar mechanical and electrical properties), it is preferable that the laminate stack into which the molten metal will form the bars and the two end rings be kept at an elevated temperature to ensure that the molten metal that is made to flow through the long thin channels formed in the laminate stack remain in a molten state, as otherwise channel clogging may occur. The introduction of the molten metal into the mold preferably takes between about 1 and 3 seconds, although it will be appreciated that for larger squirrel cages, this time may be slightly longer. This is longer than conventional times, which are typically measured in fractions of a second (such as about one tenth of a second), and allows for a less turbulent flow. In one form, the temperature of the laminate stack is heated to between 800 and 1200 degrees Fahrenheit in preparation for the receipt of the molten metal. Moreover, with a segmented inductive heating rod, the method of the present invention may impart different temperatures to various parts of the laminate stack along its length. For example, the portion where the end rings will be formed could be heated to a different temperature than that of the slots. Likewise, the temperature along the length of the slots can be varied.

Cavities formed in the mold to define the squirrel-cage include a pair of end rings axially disposed relative to one another and numerous substantially longitudinal bars extending from a first of the pair of end rings to a second or the pair of end rings such that the bars and the end rings define a plurality of continuous current loops. As stated above, the bars may be slightly askew relative to the axial dimension of the squirrel-cage to promote a smoother distribution of generated torque. The laminate stack has numerous substantially axial-extending slots distributed around the stack periphery. When the molten metal is introduced into the mold, the metal flows into the slots to form the bars that when solidified (such as by cooling) form a cylindrical cage-like structure that cooperates with the stack. As stated above, heating the stack helps ensure that the molten metal flowing through the thin elongate channels of the slots does not prematurely freeze. One way to heat the laminate stack comprises induction heating. More particularly, such induction heating can be achieved by placing a heating element such as an induction coil into a central axial bore defined along the axial center of the stack. While the heating may take place prior to placing the stack in the mold, in a preferred form, such heating takes place once the laminate stack is placed within the mold.

In a more particular form, introducing the molten metal into the mold includes using a low pressure source. In the present context, the term "low pressure" includes those values necessary to ensure complete flow of the molten metal to all parts of the longitudinal bars and end rings formed between the mold and the laminate stack, but not so great that it exhibits a degree of porosity different than when the molten metal is in a quiescent state. As discussed above, molten metal introduction pressure on the order of 2000 PSIG or more is far in excess of that which would be considered "low pressure" in the present context. Stated another way, the introduction of the molten metal through the low pressure source means that the molten metal is in a less turbulent state; in this way, the metal, upon cooling and solidifying, is substantially free of porosity. In fact, while the inventors have discovered that pressure values of about 10 PSIG would generally be sufficient to achieve the desired molten metal flow, they recognize that values up to about 30 PSIG may be used and still considered "low pressure". In one form, the low pressure source may be a low pressure furnace, a pump, a gravity feed or some combination thereof. For example, if a pump, the source may be a conventional electromechanical, pneumatic or hydraulic device.

According to another aspect of the invention, a method of casting a rotor for an electric motor is disclosed. The method includes forming a mold around a laminate stack, heating the laminate stack to an amount sufficient to keep a molten metal introduced thereto in a substantially molten state at least until a substantial entirety of a squirrel-cage cooperative with the laminate stack is formed, pressurizing the molten metal to an amount sufficient to cause the metal to flow through a cavity with a shape that substantially corresponds to a first end ring to be formed at one end of the laminate stack, a plurality of channels formed in the laminate stack and a cavity with a shape that substantially corresponds to a second end ring at an opposing end of the laminate stack such that the molten metal substantially fills the cavities and the plurality of channels to integrally form, upon solidification of the molten metal, the rotor from squirrel-cage and the laminate stack, cooling the molten metal and the laminate stack and removing the rotor from the mold.

Optionally, the pressurizing comprises pressurizing the molten metal to no more than about 30 PSIG, while in a more particular option, the amount of pressurization can be less than about 10 PSIG. As stated above, such pressurizing can be done actively, such as with a pump, or it can be achieved passively, such as through a gravity feed that can provide a sufficient net positive suction head (NPSH). In another option, the molten metal comprises one of an aluminum-based alloy or a substantially pure aluminum. Furthermore, the heating of the laminate stack to an amount sufficient to keep a molten metal introduced thereto in a substantially molten state further comprises maintaining the laminate stack at a temperature between about 300 and 800 degrees Fahrenheit, for medium grade casting, and between about 800 and 1200 degrees Fahrenheit for high integrity castings, while the molten metal is being flowed through the plurality of channels. In the present context, a high grade casting would be almost completely free from porosity, while a medium grade casting would be expected to have some minor porosity in the center rings or related thick sections of the castings.

According to yet another aspect of the invention, a method of casting molten aluminum into numerous channels formed in a laminate stack for a rotor of an electric motor is disclosed. The method includes forming a mold around the laminate stack, heating the laminate stack, maintaining at least a portion of the laminate stack adjacent the plurality of channels at a temperature sufficient to keep the molten aluminum in the molten state at least long enough for the molten aluminum to pass through the plurality of channels, applying sufficient pressure to the molten aluminum to force it through the plurality channels, flowing the molten aluminum through the plurality of channels, cooling the molten aluminum and the laminate stack such that together they cooperate to define the rotor as an integrated rotor, and removing the rotor from the mold.

Optionally, heating the laminate stack may be done with either a uniform temperature along the stack, or may be done with a temperature gradient along the stack length. In either case, an inductive heating device (such as an inductive heating rod) can be used to impart heat to the laminate stack. In another option, the temperature is maintained at least about 800 degrees Fahrenheit for premium grade castings. Moreover, the amount of pressure deemed to be sufficient is at least about ten PSIG. Furthermore, such pressure can be achieved by using one or more a gravity feed, a pump and a furnace. As with the previous aspects, the present method avoids having the pressure be so high that gas entrapment and other indicia of porosity formation is avoided. As with the previous aspects, the mold may be made from a sand-based material to give it a sand-based structure. In addition, binders may be used to give it more of a permanent, self-supporting structure.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
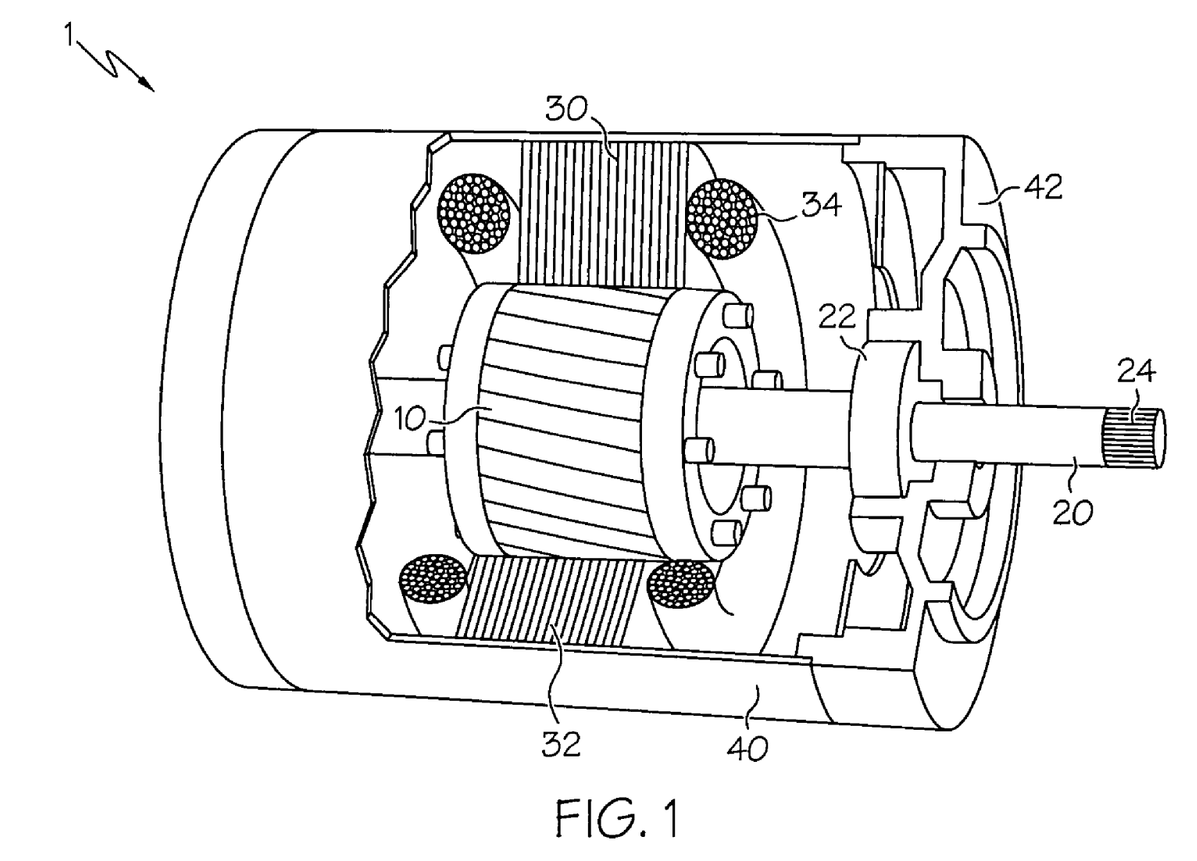
FIG. 1 shows a perspective cutaway view of a motor showing with particularity the relationship between a stator and a squirrel-cage rotor the latter of which can be made according to the present invention.

Referring initially to FIG. 1, an electric motor 1 is shown, where a rotor 10 spins in response to changes in a magnetic field from stator 30. Rotor 10 is mounted on a shaft or mandrel 20 so that the spinning motion of the rotor 10 can be turned into useful work. For example, teeth 24 formed in the end of shaft 20 can be used to interact with a complementary surface to turn a wheel, pulley, fan or the like. Motor 1, in the configuration shown where the rotor 10 and stator 30 are not in contact with one another, is referred to as an induction motor, where the principles of reciprocal induction of electric current and magnetic flux in appropriately-configured structures are well-known. A housing 40 is used to contain the rotor 10 and stator 30, while the rotatable shaft 20 may be secured to the housing 40 via one or more bearings 22 that could interact with an end plate 42 that is formed with or otherwise secured to the housing 40. As can be seen, stator 30 includes a magnetically permeable pole 32 surrounded by numerous field coils 34. The pole 32 may be assembled as a laminate of individual plates (discussed in more detail below in conjunction with the rotor 10) that acts as an electromagnet as electric current is passed through the windings of the field coils 34. Initial connection to the coils 34 may come from an external electrical source, such as line power, a generator, batteries or other conventional sources.

Figure 2:
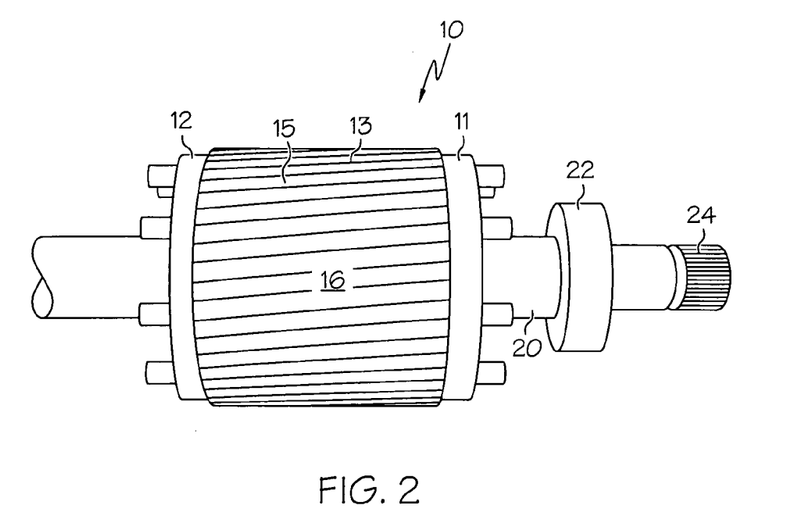
FIG. 2 shows the rotor of the motor of FIG. 1, highlighting the connectivity of the cage's end rings and longitudinal bars, as well as the placement of the laminate stack within the cage.
Figure 3:
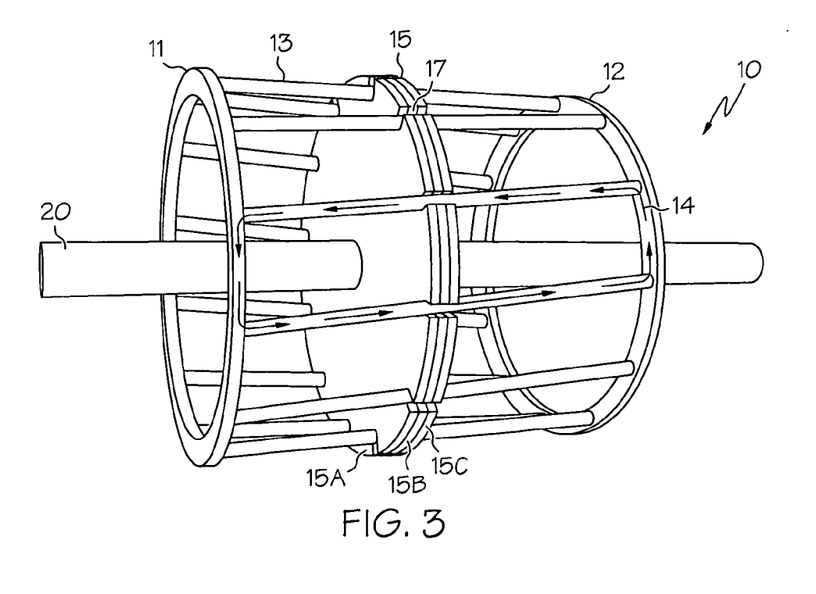
FIG. 3 shows a rudimentary form of a cage where most of the plates making up the laminate stack are removed to highlight coil loops formed by the bars and end rings.

Referring next to FIGS. 2 and 3, rotor 10 is often referred to as a squirrel-cage rotor, and includes a first end ring 11, a second end ring 12 axially spaced relative to the first end ring 11 to define a generally cylindrical shape, and a plurality of rotor bars 13 that extend substantially longitudinally between the end rings 11 and 12 around the periphery of the cylindrical shape. Electrically, each of the bars 13 and end rings 11 and 12 are made of a conductive material so that the connection of the rotor bars 13 to the end rings 11 and 12 produces numerous generally rectangular-shaped current loops 14. A magnetically permeable material (for example, iron) is placed within the rotor 10 in the space between the bars 13 and end rings 11 and 12 such that a current passing through the loops 14 induces a stronger magnetic flux in the rotor 10. Preferably, the material placed in between the bars 13 and end rings 11 and 12 is made up of a numerous laminated plates that are held together either by an interlock or by the casting and mounted to the shaft 20. Such a configuration is referred to as a laminate stack 15, laminate assembly or some variant thereof. Because the electrical conductivity of the bars 13 and end rings 11 and 12 is significantly greater than that of the laminate stack 15, a vast majority of the electric current is routed through the continuous loops 14 formed by the bars 13 and end rings 11 and 12. Thus, upon the cyclical changes in magnetic field from the adjacent (but not touching) electromagnets set up in stator 30, the back-and-forth passage of current in the loops 14 cause the laminate stack 15 to function as an electromagnet that forces the rotor 10 to spin to bring each portion 16 toward or away from a corresponding adjacent pole 32 on the stator 30, depending on whether they have the same or opposite polarity. As can be seen in FIGS. 1 and 2, the outer surface of portions 16 define a generally smooth profile that because it lies along the same radial path with the bars 13 and end rings 11 and 12, helps define the generally cylindrical shape of the rotor 10.

Referring with particularity to FIG. 3, the components used to define the cage of squirrel-cage rotor 10 are shown, where most of the plates making up laminate stack 15 are removed for clarity. In fact, only three of the plates 15A, 15B and 15C are shown, each with slots 17 formed at the plate outer periphery and spaced relative to one another by a distance to allow them to accommodate the longitudinal bars 13 that will be formed therein. As stated above, the end rings 11, 12 and rotor bars 13 are fabricated by casting them into the slots 17 formed in the plates of the laminate stack 15. As shown in both FIGS. 2 and 3 (as well as in FIG. 1) the longitudinal bars 13 are slightly skewed relative to the longitudinal axis (which generally coincides with shaft 20) of rotor 10 to provide a more even distribution of the torque imparted to the laminate stack 15 and shaft 20. One of the loops 14 is highlighted to show one notional path (shown by arrows) that the electrical current may take during one portion of an alternating electromagnetic cycle.

Figure 4A:
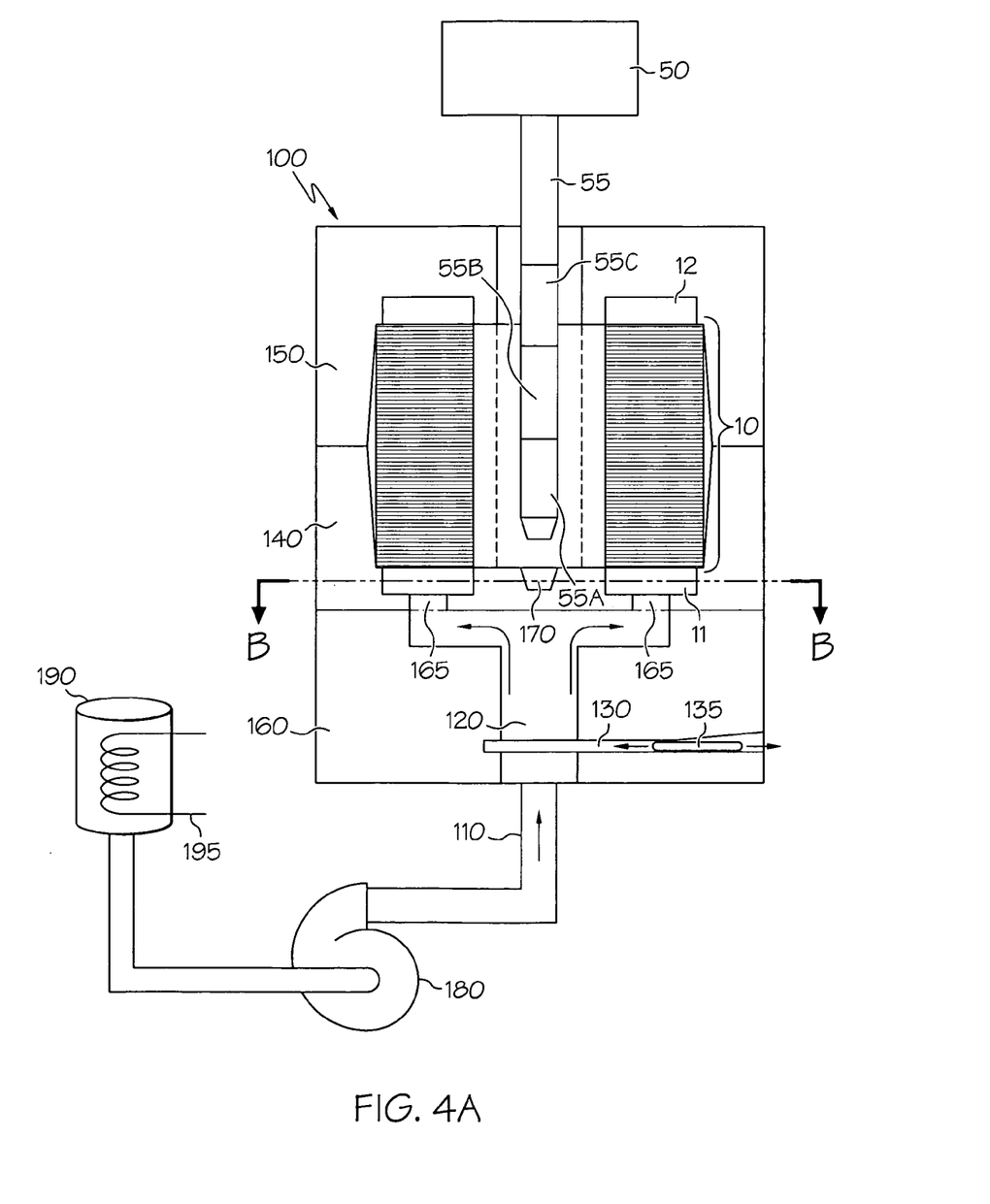
FIG. 4A shows an arrangement of tooling used to produce the cast rotor of FIG. 1.
Figure 4B:
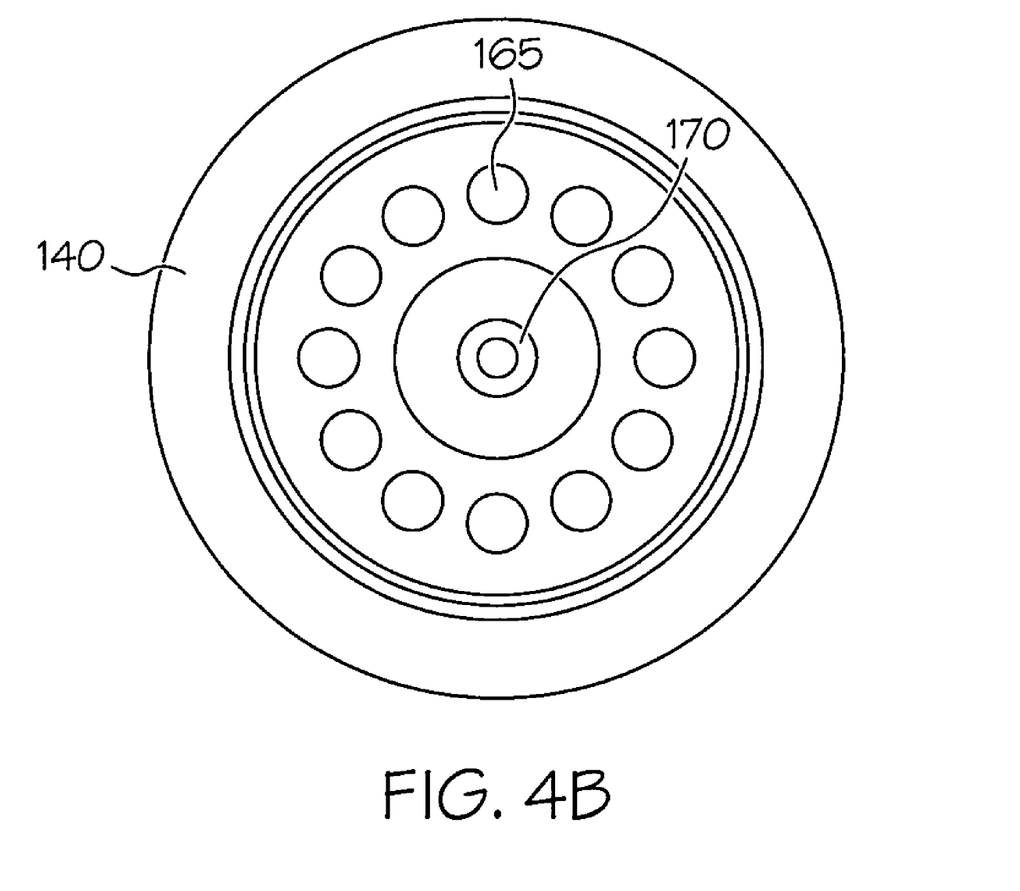
FIG. 4B shows the top view of the gate core along the lines B-B of FIG. 4A.

Referring next to FIGS. 4A and 4B in conjunction with FIG. 3, the tooling arrangement including a mold 100 for vertically casting a squirrel-cage rotor 10 is shown. As is well-known in the sand casting art, a drag that corresponds to a runner/shut off core 160 and a cope that corresponds to a laminate stack core 150 define lower and upper parts of a cavity within the mold 100 (also called a mold package), where a frame or related enclosure defines the respective laminate stack core 150 and gate core 140 halves that contain and provide support to the molding sand as the molten metal is poured into mold 100. A runner/shut off core 160 is situated vertically beneath the gate core 140 and the laminate stack core 150, and is used to introduce the molten metal into the mold 100. The cavities are formed in the cores 140 and 150 directly above and below the laminate stack 15, while the sand cores are made using a separate core box (not shown). A mixture of sand and resin is blown into the core box, while a catalyst is added to harden the mixture. This hardened resin sand mixture is removed from the core box, and can now be used as a sand core with other sand cores to make up the mold 100 for the casting. In a preferred form, the laminate stack core 150 and gate core 140 are sand molds, but could also be made from tool steel. The laminate stack 15 forms part of the pattern that is placed within mold 100 and surrounded by sand. Unlike some casting techniques (for example, shell casting, investment casting and other forms of sand casting) where the pattern is sacrificial, the laminate stack 15 becomes a part of the finished product. As exemplified above, the runner/shut off core 160 and gate core 140 (as well as the laminate stack core 150) are produced by conventional core manufacturing processes, where the runner/shut off core 160 and the gate core 140 are assembled together. An alignment pin (not shown) can be used and placed in the laminate stack seat 170 to aid in the placement of the lamination stack on the gate core 140. Once the laminate stack 15 has been placed on the gate core 140, the laminate stack core 150 is placed over the laminate stack 15 and the alignment pin (if needed) would be removed. As stated above, sand cores are rigid and formed prior to mold assembly, so that the laminate stacks 15 can be placed in the hardened mold form. Passages for a riser stalk 110, runner 120 and shut off plate 135 that is placed in slot 130 that is part of runner/shut off core 160 are formed in the sand cores to allow metal to flow into the mold 100. The shut off plate 135 can be inserted in the slot 130 to selectively cut off molten metal flow once the mold 100 has been filled.

As shown, riser stalk 110 is part of a low pressure furnace or pump system 180 that takes the molten feedstock from a supply 190. A furnace or related heat supply 195 can be used to raise the temperature of the metal feedstock to an amount sufficient to turn the metal into or otherwise maintain it in a molten state. The runner/shut off core 160 fluidly connects the supply 190 to the gates 165 that are usually designed with a specific location and size and attach to the part. Once the mold 100 is ready, molten metal is fed to it from supply 190 through a riser stalk 110 to runner 120 and past gates 165 that are positioned in gate core 140. In one form, the laminate stack 15, as well as the cavities used to form the end rings 11, 12 and bars 13 are situated between the gate core 140 and laminate stack core 150. For example, it could positioned halfway; however, such placement is not a necessary part of the invention, as the mold 100 could be parted in other suitable locations. When molten metal is injected through the shut off plate 135 that is placed in slot 130, it is first directed by the lower (i.e., first) end ring cavity 11 and then once the cavity is full, the molten metal starts the upward filling of rotor slots 17 to form rotor bars 13. Because the slots 17 are filled concurrently, the molten metal rises and enters into upper (i.e., second) end ring cavity 12 simultaneously. After the cavity is filled, a shut off plate (either sand or metallic) 135 is inserted into the shut off slot 130. This allows the mold 100 to be removed from the furnace riser stalk 110. In the case of an pump system, the furnace riser stalk 110 would be replaced by an electrically heated launder tube.

Once the poured metal has cooled enough to solidify, the mold 100 can be separated along the gate core 140, laminate stack core 150, and runner/shut off core 160, and the sand removed to reveal the cast part that can be separated from runner 120 by conventional separation techniques, such as sawing or breaking at a relatively thin location. As stated above, it will be appreciated by those skilled in the art that other alternate squirrel-cage rotor 10 designs may be formed by the present invention, such as rotors with bars that are entirely aligned along the shaft 20 axis, as well as other shapes not specifically illustrated or described. Also, while the method shown and described is done so within the context of vertical casting, it is contemplated that molten metal may be injected into the mold 100 in other orientations without departing from the scope of the present invention. For example, conventional vents (not shown) could be added in the form of small holes upward from the top of the second) end ring cavity 12.

A small amount of pressure (shown notionally as being provided by pump 180) is used to promote the molten metal fill into the mold, although far less than used in conventional casting. By keeping the pressure low, the molten metal is thoroughly injected, while maintaining a generally turbulence-free, substantially quiescent flow of the molten metal.

Such lower pressures may change fill times from a small fraction of a second (for example, around one tenth of a second) to no more than two or three seconds. Once the metal has cooled, a squirrel cage rotor 10, such as that shown in FIG. 1, is formed. It can be removed from the mold 100. As stated above, various sacrificial molten metal flow paths, such as gate 165 and runner 120 may be mechanically broken as the mold 100 is opened and the cast rotor 10 is removed, or it might be removed by sawing or other means. In another version, the necessary low pressure may be provided by an appropriately-configured bottom fill. For example, if there is ample pressure head established through the runner 120 and related molten metal delivery plumbing, supplemental pressurizing devices such as pump 180 may not be required.

As discussed above, the laminate stack 15 is assembled into the mold 100. Prior to introduction of the molten metal from supply 190 into the mold, an inductive heating rod 55 with inductor holder 50 can be inserted into the central void formed in the plates of the laminate stack 15 where the shaft 20 will eventually be secured. By heating up the laminate stack 15, a sufficient amount of thermal mass will be present to minimize the chance of premature molten metal freezing in the passages that upon filling with the metal will make up the squirrel-cage part of the rotor 10. The inductor rod 55 can be segmented into sections 55A, 55B and 55C to provide varying amounts of heat axially along the lamination stack. With such segmented heating and the thermal gradient that separately controllable sections 55A, 55B and 55C can produce, it is possible to tailor the thermal treatment, which can be done to aid in directional solidification of the casting for improved soundness. Furthermore, the inductive heating rod 55 can be operated to remain on during the filling of the mold 100 with molten metal. It will be appreciated by those skilled in the art that while three separate inductive heating sections 55A, 55B and 55C are notionally shown, more or fewer such sections can be included, depending on the heating needs.

Instead of the sand-based mold 100 shown in FIG. 4A, a semi-permanent tool steel mold could be used. In this case, the mold may employ a coated tool steel form, where the coating (which can survive for numerous rotor-forming repetitions) is used to insulate the tool steel from direct contact with the molten metal. As discussed above, when the molten metal is substantially pure aluminum, it will vigorously attack the portion of the steel tooling that it comes in contact with. For complex casting geometries and gating/runner geometries, a sand core may be introduced into the tool steel mold to complete the mold assembly.

Figure 5:
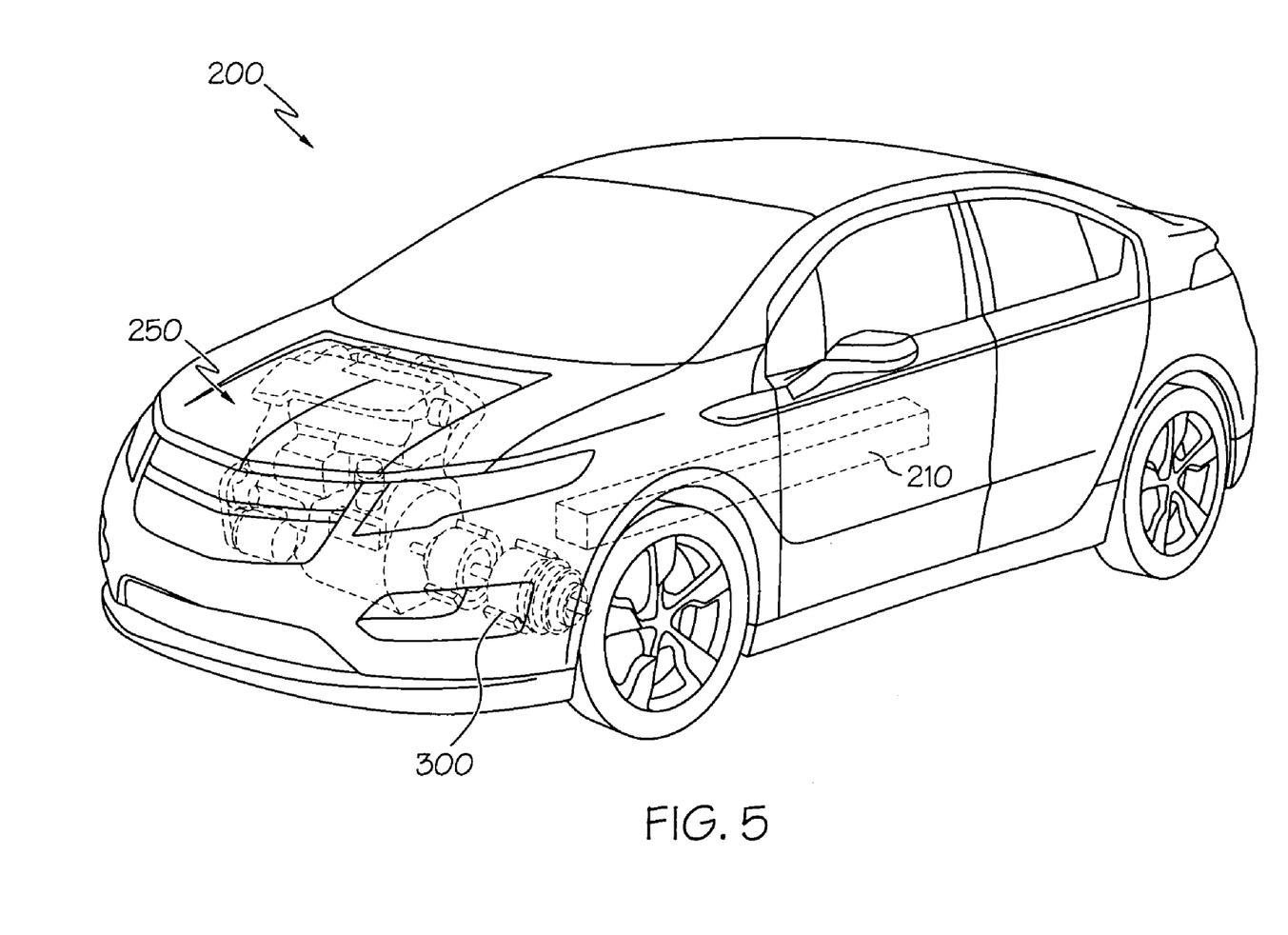
FIG. 5 shows a vehicle using an electric motor that employs a cast squirrel-cage rotor of the present invention to provide at least a part of the vehicle's propulsive needs.
Figure 6:
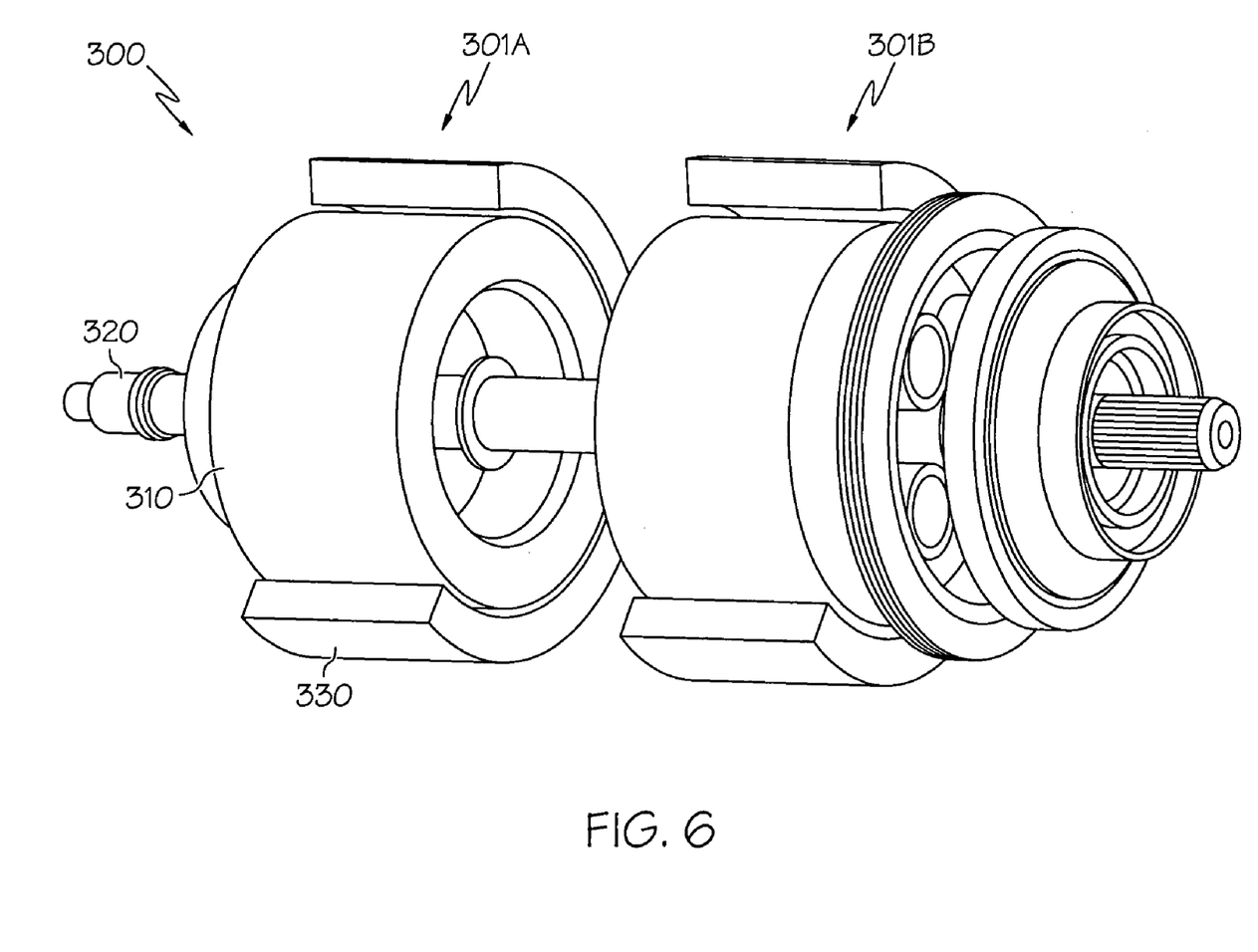
FIG. 6 shows an electrically variable automotive transmission architecture that can include the electric motor made in accordance with the present invention and be used in the vehicle of FIG. 5.

Referring lastly to FIGS. 5 and 6, an example of a vehicular application and a variable transmission architecture for the electric motor 1 made according to the present invention is shown. Automobile 200 may employ either a hybrid or related range-extending propulsion source, where either the electric motor 1 or a conventional internal combustion engine 250 may be used. In one form, the internal combustion engine 250 may, rather than being mechanically connected to the wheels (as is common with conventional automobiles), serve as a backup system to extend the range of the electric motor 1, thereby functioning as a range-extending (rather than truly hybrid) power source. In such case, when the electricity from the primary power source (for example, a bank of on-board lithium-ion batteries 210, also called a battery pack) starts to run low, the internal combustion engine 250 can be used to generate electrical power through a generator (not shown) to recharge the batteries 210 or run the electric motor 1 directly, depending on the needs of the batteries 210 and the power demand at the wheels. Recharging of the lithium-ion batteries 210 can also take place when the automobile 200 is stationary by plugging the battery pack into a conventional residential or commercially-available electrical outlet.

In another form, a two-mode hybrid propulsion system may be used. In such case, the electric motor 1 may cooperate with the internal combustion engine 250 so that the electric motor 1 is used for low-speed operation (for example, up to approximately 10 miles per hour) and regenerative braking, while the internal combustion engine 250 can be used for high-speed operation. As shown in FIG. 6, an electrically variable transmission 300 may be equipped with the electric motor 1 made by the present invention. One of the primary benefits of the electrically variable transmission 300 is that it can continuously vary the speed of the vehicle's engine, thereby enhancing overall operational efficiency through optimal speed and load point matching. Transmission 300 is also well-suited to continuous regenerative braking, another efficiency-enhancing design. Through the use of input-split and compound-split continuously variable electrically variable transmission ranges and multiple (for example, four) fixed gear ratios, as well as parallel electric motor boosting and regenerative braking, the electrically variable transmission 300 may enjoy to maximized utility. As with the motor 1 of FIG. 1, the transmission 300 includes a rotor 310 that is mounted on a shaft 320 and rotates relative to the stationary stator 330. As can be seen, the transmission 300 includes two motors 301A and 301B. Shaft 320 may be operatively coupled to a driveshaft (not shown) of automobile 200 along with, or separately from the driveshaft that is coupled to the internal combustion engine 250.

While certain representative embodiments and details have been shown for purposes of illustrating the invention, it will be apparent to those skilled in the art that various changes may be made without departing from the scope of the invention, which is defined in the appended claims.

What is claimed is:

1. A method of making a squirrel-cage rotor for an electric motor, said method comprising:

forming a sand-based mold around a laminate stack portion of said electric motor;

inductively heating said laminate stack with an inductive heating rod with an inductor holder, the inductive heating rod being inserted into a central void formed in plates of the laminate stack, the inductive heating rod being segmented into a plurality of separately controllable sections providing varying amounts of heat along the axial dimension of the laminate stack and operated to remain on during a filling of the mold with molten metal;

introducing a molten metal into said mold using low feed pressure of between about 10 pounds per square inch gauge and about 30 pound per square inch gauge such that said molten metal substantially fills a space defined in said laminate stack that corresponds to a cage of said rotor, said heated laminate stack possessing sufficient thermal mass to keep said molten metal in a substantially molten state until a substantial entirety of said cage is formed;

cooling said molten metal and said laminate stack such that said rotor is substantially solidified; and removing said substantially solidified rotor from said mold.

2. The method of claim 1, wherein said forming a mold around a laminate stack comprises substantially enveloping said laminate stack with a flowable casting media.

3. The method of claim 2, wherein said flowable casting media comprises a mixture of sand and a binder.

4. The method of claim 3, wherein said binder comprises at least one of an organic binder and an inorganic binder.

5. The method of claim 1, wherein said forming a mold around a laminate stack comprises substantially enveloping said laminate stack with a coated steel tool.

6. The method of claim 1, wherein the temperature of said laminate stack is, upon said heating, between about 800 degrees Fahrenheit and about 1200 degrees Fahrenheit during said introducing a molten metal into said mold.

7. The method of claim 1, wherein said plurality of separately controllable sections of the inductive heating rod comprises at least three separately controllable sections.

8. The method of claim 1, wherein said mold is shaped such that cavities formed therein that define said cage comprise a pair of end rings axially disposed relative to one another and a plurality of substantially longitudinal bars extending from a first of said pair of end rings to a second of said pair of end rings such that said substantially longitudinal bars and said pair of end rings define a plurality of continuous current loops.

9. The method of claim 8, wherein said laminate stack defines a plurality of slots extending substantially longitudinally and around the periphery thereof such that each of said plurality of substantially longitudinal bars are formed in a corresponding one of said plurality of slots.

10. The method of claim 1, wherein said laminate stack comprises a magnetically permeable material.

11. The method of claim 1, wherein said induction heating comprises placing a heating element into a central axial bore defined in the substantial center of said laminate stack.

12. The method of claim 1, wherein said heating takes place once said laminate stack is placed within said mold.

13. The method of claim 1, wherein said molten metal introduced into said mold comprises an aluminum-based metal, a copper-based metal or combinations thereof.

14. The method of claim 13, wherein said aluminum-based metal comprises a substantially pure aluminum.

15. The method of claim 1, wherein said introducing comprises using a low pressure source such that when said molten metal is introduced into said mold, it is substantially free of porosity.

16. The method of claim 15, wherein said low pressure source comprises at least one of a low pressure furnace, a pump and a gravity feed.

17. The method of claim 16, wherein said low pressure source is configured to deliver said molten metal into said mold at less than 30 pounds per square inch gauge.

18. A method of casting a rotor for an electric motor, said method comprising:
  forming a sand-based mold around a laminate stack;
  inductively heating said laminate stack to an amount sufficient to keep a molten metal introduced thereto in a substantially molten state at least until a substantial entirety of a squirrel-cage cooperative with said laminate stack is formed with an inductive heating rod with an inductor holder, the inductive heating rod being inserted into a central void formed in plates of the laminate stack, the inductive heating rod being segmented into a plurality of separately controllable sections providing varying amounts of heat along the axial dimension of the laminate stack and operated to remain on during a filling of the mold with molten metal;
  pressurizing said molten metal with a low feed pressure of between about 10 pounds per square inch gauge and about 30 pound per square inch gauge such that said molten metal flows through a cavity with a shape that substantially corresponds to a first end ring to be formed at one end of said laminate stack, a plurality of channels formed in said laminate stack and a cavity with a shape that substantially corresponds to a second end ring at an opposing end of said laminate stack to substantially fill said cavities and said plurality of channels to integrally form, upon solidification of said molten metal, said rotor from squirrel-cage and said laminate stack;
  cooling said molten metal and said laminate stack; and
  removing said rotor from said mold.

19. The method of claim 18, wherein said pressurizing said molten metal to no more than about 30 pounds per square inch gauge.

20. The method of claim 18, wherein said molten metal comprises one of an aluminum-based alloy or a substantially pure aluminum.

21. The method of claim 20, wherein said heating said laminate stack to an amount sufficient to keep a molten metal introduced thereto in a substantially molten state further comprises maintaining said laminate stack at a temperature of at least about 300 degrees Fahrenheit while said molten metal is being flowed through said plurality of channels for a medium-grade casting and at least about 800 degrees Fahrenheit for a high-grade casting.

22. A method of casting molten aluminum into a plurality of channels formed in a laminate stack for a rotor of an electric motor, said method comprising:
  forming a sand-based mold around said laminate stack;
  inductively heating said laminate stack with an inductive heating rod with an inductor holder, the inductive heating rod being inserted into a central void formed in plates of the laminate stack, the inductive heating rod being segmented into a plurality of separately controllable sections providing varying amounts of heat along the axial dimension of the laminate stack and operated to remain on during a filling of the mold with molten metal;
  maintaining at least a portion of said laminate stack adjacent said plurality of channels at a temperature sufficient to keep said molten aluminum in said molten state at least long enough for said molten aluminum to pass through said plurality of channels;
  applying low feed pressure of between 10 pounds per square inch gauge and about 30 pound per square inch gauge to said molten aluminum to force it through said plurality of channels;
  flowing said molten aluminum through said plurality of channels;
  cooling said molten aluminum and said laminate stack such that together they cooperate to define said rotor as an integrated rotor; and
  removing said rotor from said mold.

23. The method of claim 22, wherein said maintained temperature is at least about 300 degrees Fahrenheit.

24. The method of claim 22, further comprising using at least one of gravity feed, a pump and a furnace to attain said low feed pressure to said molten aluminum.

25. The method of claim 22, wherein said mold comprises a coated steel tool structure.

26. The method of claim 20, wherein the plurality of separately controllable sections of the inductive heating rod comprises at least three separately controllable sections.

* * * * *